(12) United States Patent
Murakami et al.

(10) Patent No.: US 10,989,989 B2
(45) Date of Patent: Apr. 27, 2021

(54) IMAGE PICKUP APPARATUS EQUIPPED WITH DISPLAY DEVICE

(71) Applicant: CANON KABUSHIKI KAISHA, Tokyo (JP)

(72) Inventors: Taro Murakami, Musashino (JP); Kiyoshi Nitto, Saitama (JP); Nobuyoshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/745,707

(22) Filed: Jan. 17, 2020

(65) Prior Publication Data
US 2020/0241394 A1 Jul. 30, 2020

(30) Foreign Application Priority Data

Jan. 29, 2019 (JP) .............................. JP2019-013023

(51) Int. Cl.
| G03B 17/04 | (2021.01) |
| G03B 13/02 | (2021.01) |
| H04N 5/225 | (2006.01) |

(52) U.S. Cl.
CPC ............. *G03B 17/04* (2013.01); *G03B 13/02* (2013.01); *H04N 5/22525* (2018.08)

(58) Field of Classification Search
None
See application file for complete search history.

(56) References Cited

U.S. PATENT DOCUMENTS

| 2002/0171748 | A1* | 11/2002 | Kim ...................... H04N 5/2252 348/333.01 |
| 2015/0029380 | A1* | 1/2015 | Noh ...................... H04N 5/2252 348/333.01 |
| 2019/0166290 | A1* | 5/2019 | Suzuki .................. G06F 3/0346 |
| 2020/0099863 | A1* | 3/2020 | Osada .............. H04N 5/225251 |
| 2020/0112660 | A1* | 4/2020 | Nitto .................. H04N 5/23293 |
| 2020/0228691 | A1* | 7/2020 | Murakami .......... H04N 5/22525 |
| 2020/0249547 | A1* | 8/2020 | Iwai ....................... G03B 17/04 |
| 2020/0252530 | A1* | 8/2020 | Iwai ....................... G03B 17/04 |

FOREIGN PATENT DOCUMENTS

| JP | 3677991 B2 | 8/2005 |
| JP | 2009-109901 A | 5/2009 |

* cited by examiner

*Primary Examiner* — William B Perkey
(74) *Attorney, Agent, or Firm* — Cowan, Liebowitz & Latman, P.C.

(57) ABSTRACT

An image pickup apparatus that can store a display device in an apparatus body and that prevents snap fit connection from releasing in a pulled-out state where the display device is pulled out while keeping ease of assembly in manufacturing. The image pickup apparatus includes a first barrel, a second barrel that is connected to the first barrel and achieves a stored state and the pulled-out state of the display device by relatively moving with respect to the first barrel, and a third barrel that is connected to the second barrel by snap fit connection. The first barrel has a fastening part at its end of connection with the second barrel so that the fastening part suppresses release of the snap fit connection in the pulled-out state and does not suppress the release of the snap fit connection in the stored state.

12 Claims, 16 Drawing Sheets

IMAGE PICKUP APPARATUS EQUIPPED WITH DISPLAY DEVICE

BACKGROUND OF THE INVENTION

Field of the Invention

The present invention relates to image pickup apparatuses, and in particular, relates to image pickup apparatuses, such as a digital still camera and a digital video camera, that are provided with a display device like an electronic view finder.

Description of the Related Art

There is a known conventional image pickup apparatus with an electronic view finder as a display device that can be stored in an apparatus body in order to miniaturize the apparatus. For example, Japanese Patent No. 3677991 discloses an image pickup apparatus that allows a user to pull out an electronic view finder stored in an apparatus body to a user's side when using the finder.

Incidentally, a snap fit method is employed as an assembling method of an electronic view finder that is moved between a stored state and a pull-out state by contracting/extending a magnifying optical system. Japanese Laid-Open Patent Publication (Kokai) No. 2009-109901 (JP 2009-109901A) is cited as a document about the snap fit method. This publication discloses a movable unit that moves inside an outer case and that consists of a lens moving member with an engagement part and a connecting member with a connection part that is connected to the engagement part by snap fit connection. The engagement part is a projection, and the connection part is a snap-fit connection elastic piece. The elastic piece is elastically deformed by the projection when the connecting member is slidden along the lens moving member. When the elastic piece is slidden to a predetermined position, the elastic piece elastically returns and the connection part is engaged with the engagement part. A gap between an inner surface of the outer case and the connection part is set smaller than a connection amount of the connection part and the engagement part in a direction that releases the connection of the both.

However, the technique given in Japanese Patent No. 3677991 has a problem that the electronic view finder is easily detached from an apparatus body when a user pulls out the electronic view finder for using. That is, although a stopper functions when the electronic view finder is pulled out from the apparatus body for using, the snap fit portion inside an eyepiece cover is easily released when an outside of an eyepiece cover is sagged. And the electronic view finder may fall out when giving force. When the electronic view finder falls out, garbage will easily adhere to a display panel, which causes a new problem that garbage is magnified and viewed through the magnifying optical system after repairing.

Moreover, even when the gap between the inner surface of the outer case and the connection part of the connecting member is set smaller than the connection amount of the snap fit connection as disclosed in JP 2009-109901A, the problem that the snap fit connection is released still remains. That is, since there are individual differences in force of pulling the electronic view finder with a hand, when the finder is pulled by quite large force, the outer case may deform elastically and the snap fit connection may be released. Particularly, in a using state where a pull-out-type view finder is pulled out, a distance between the outer case and the pulled-out finder becomes large and the amount of connection between the wall surface of the outer case and the viewfinder becomes small. Moreover, the wall of the outer case easily deforms. When such various reasons overlap, the snap fit connection tends to be released. In the meantime, when an elastic part for the snap fit connection is hardened in order to prevent the snap fit connection from releasing, a problem that ease of assembly in manufacturing is lowered will occur.

SUMMARY OF THE INVENTION

The present invention provides an image pickup apparatus that can store a display device in an apparatus body and that prevents snap fit connection from releasing in a pulled-out state where the display device is pulled out while keeping ease of assembly in manufacturing.

Accordingly, a first aspect of the present invention provides An image pickup apparatus including a first barrel, a second barrel that is connected to the first barrel, achieves a stored state of a display device in a case where a relative distance is shortened by relatively moving with respect to the first barrel, and achieves a pulled-out state of the display device in a case where the relative distance is lengthened, and a third barrel that is connected to the second barrel by snap fit connection and moves together with the second barrel with respect to the first barrel. The first barrel is a fastening part at a connection end of the first barrel at which the first barrel is connected to the second barrel so that the fastening part suppresses release of the snap fit connection in the pulled-out state of the display device and does not suppress the release of the snap fit connection in the stored state of the display device.

According to the present invention, the fastening part is disposed at the connection edge of the first barrel at which the first barrel is connected to the second barrel so that the fastening part suppresses the releasing of the snap fit connection in the pulled-out state where the relative distance is lengthened and does not suppress the releasing of the snap fit connection in the stored state where the relative distance is shortened. As a result of this, the snap fit connection is not released in the pulled-out state where the second barrel is pulled out and the snap fit connection can be released in the stored state where the second barrel is stored. Accordingly, the connection strength of the snap fit connection is reinforced so as to prevent from releasing while keeping the ease of assembly in the stored state.

Further features of the present invention will become apparent from the following description of exemplary embodiments with reference to the attached drawings.

DESCRIPTION OF THE EMBODIMENTS

Figure 1A:
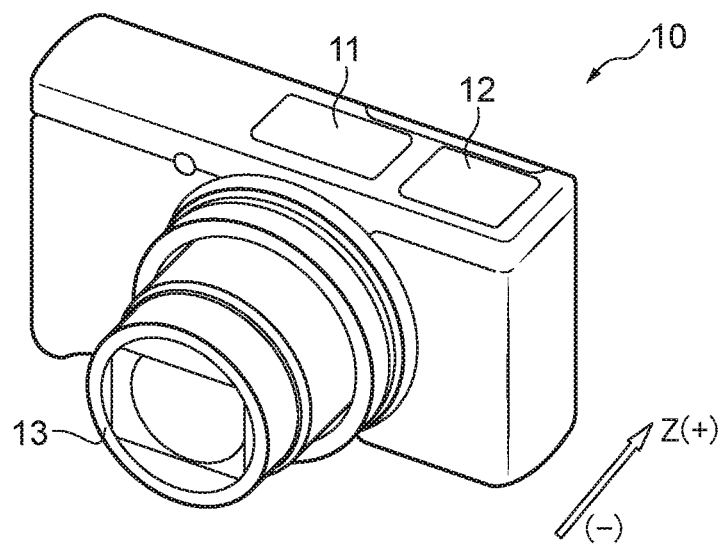
FIG. 1A, FIG. 1B, and FIG. 1C are perspective views showing an image pickup apparatus concerning an embodiment.

Hereafter, embodiments according to the present invention will be described in detail by referring to the drawings.

Figure 1B:
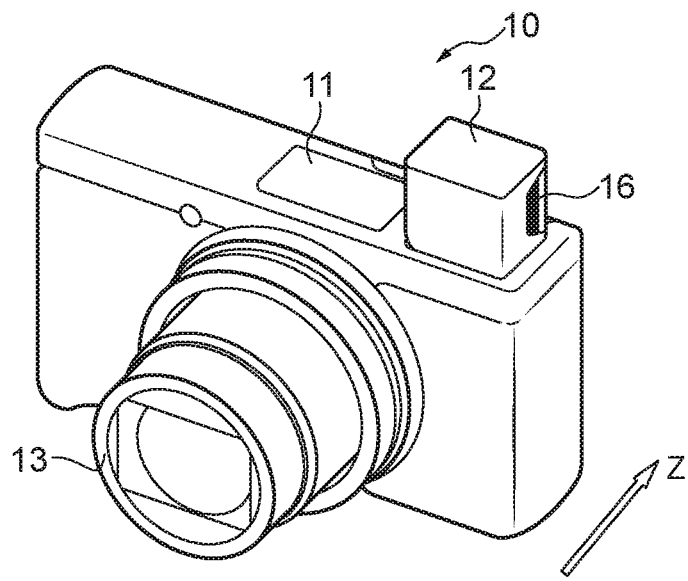
Figure 1C:
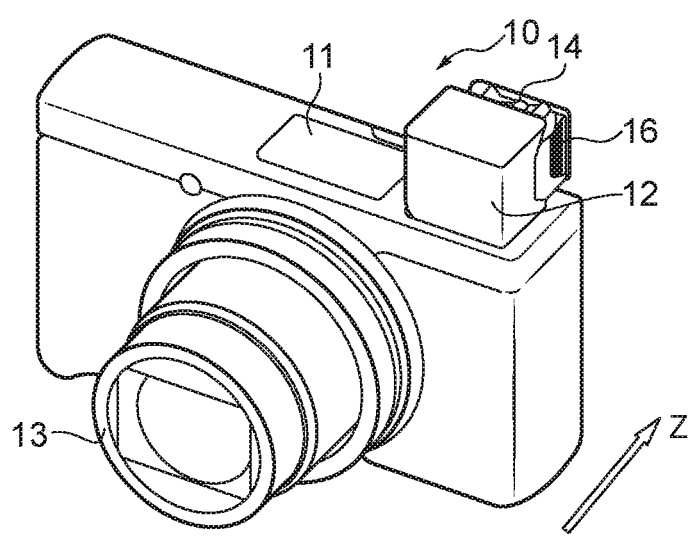

FIG. 1A, FIG. 1B, and FIG. 1C are perspective views showing an image pickup apparatus concerning an embodiment of the present invention. FIG. 1A, FIG. 1B, and FIG. 1C show a digital camera 10 as the image pickup apparatus. The digital camera 10 is provided with a flash unit 11, a pop-up unit 12, and a lens barrel unit 13. The pop-up unit 12 is configured to be movable between a state (FIG. 1A) stored in a body of the digital camera 10 and a state (FIG. 1B) projected upwardly from the body of the digital camera 10. Since the pop-up unit 12 is configured to be stored in the apparatus body, a top surface becomes a flat appearance surface when not in use.

Hereinafter, a front-and-back direction of the digital camera 10 is called a Z direction for convenience. Moreover, when the front and back in the Z direction are distinguished, the front of the digital camera 10, i.e., the side of the lens barrel unit 13 (an object side) is called a minus direction (−Z direction), and the back is called a plus direction (+Z direction). Accordingly, FIG. 1A, FIG. 1B, and FIG. 1C are the perspective views of the digital camera 10 viewed from the −Z side (the object side). The Z direction is parallel to an optical axis (an image pickup optical axis) of the lens barrel unit 13.

As shown in FIG. 1C, the pop-up unit 12 contains an electronic view finder unit (hereinafter referred to as a "finder unit") 14 equipped with an eyepiece rubber 16. The finder unit 14 functions as a display device.

In a state where the pop-up unit 12 is projected upwardly the finder unit 14 is movable with respect to the pop-up unit 12 in the Z direction so as to be stored and be pulled out. When a user of the camera pulls out the eyepiece rubber 16 exposed to the external appearance of the finder unit 14 backwardly (+Z direction), the state transfers to a pulled-out state where the finder unit 14 is available. FIG. 1B shows a stored state of the finder unit 14, and FIG. 1C shows the pulled-out state of the finder unit 14.

Figure 2A:
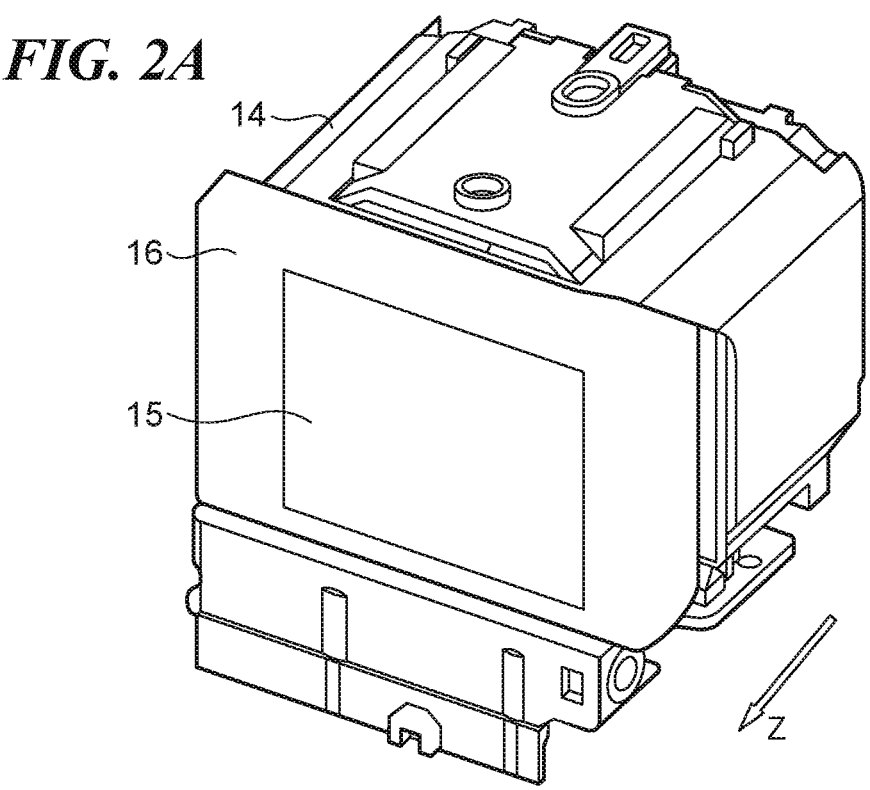
FIG. 2A and FIG. 2B are perspective views showing a finder unit of the image pickup apparatus in FIG. 1A.
Figure 2B:
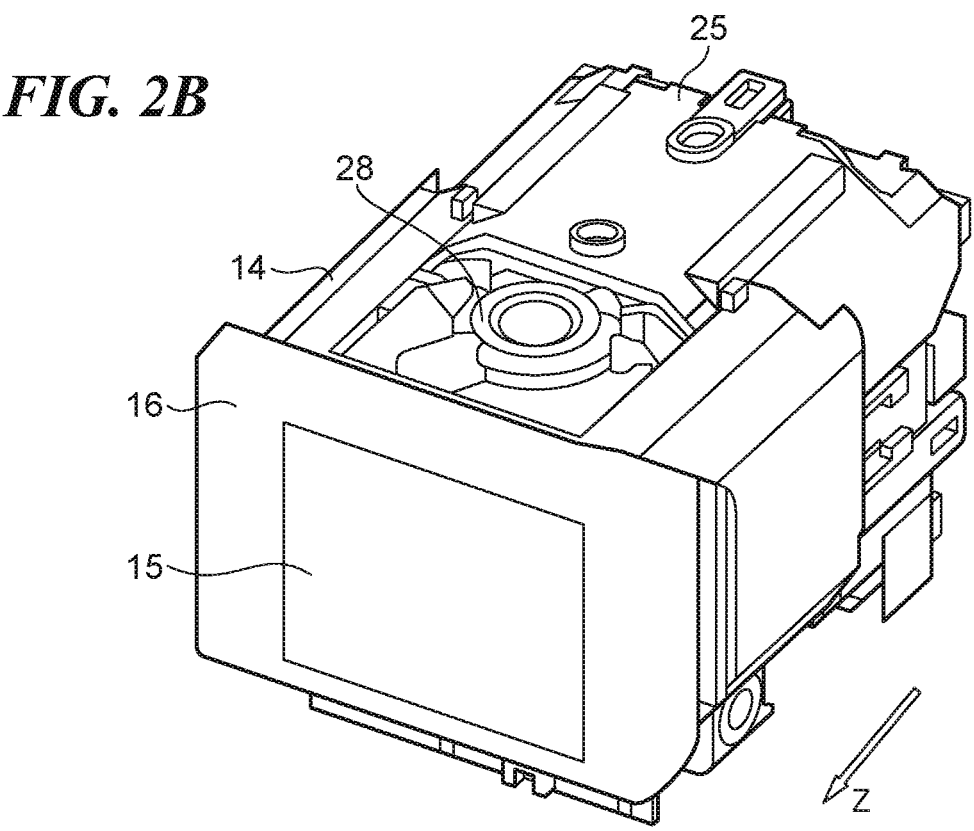

FIG. 2A and FIG. 2B are perspective views of the finder unit 14 of the image pickup apparatus in FIG. 1A. FIG. 2A shows the stored state and FIG. 2B shows the pulled-out state. In FIG. 2A and FIG. 2B, the finder unit 14 is provided with the eyepiece rubber 16 and an eyepiece glass 15, and a visibility adjustment lever 28 is provided on its top surface.

Figure 3:
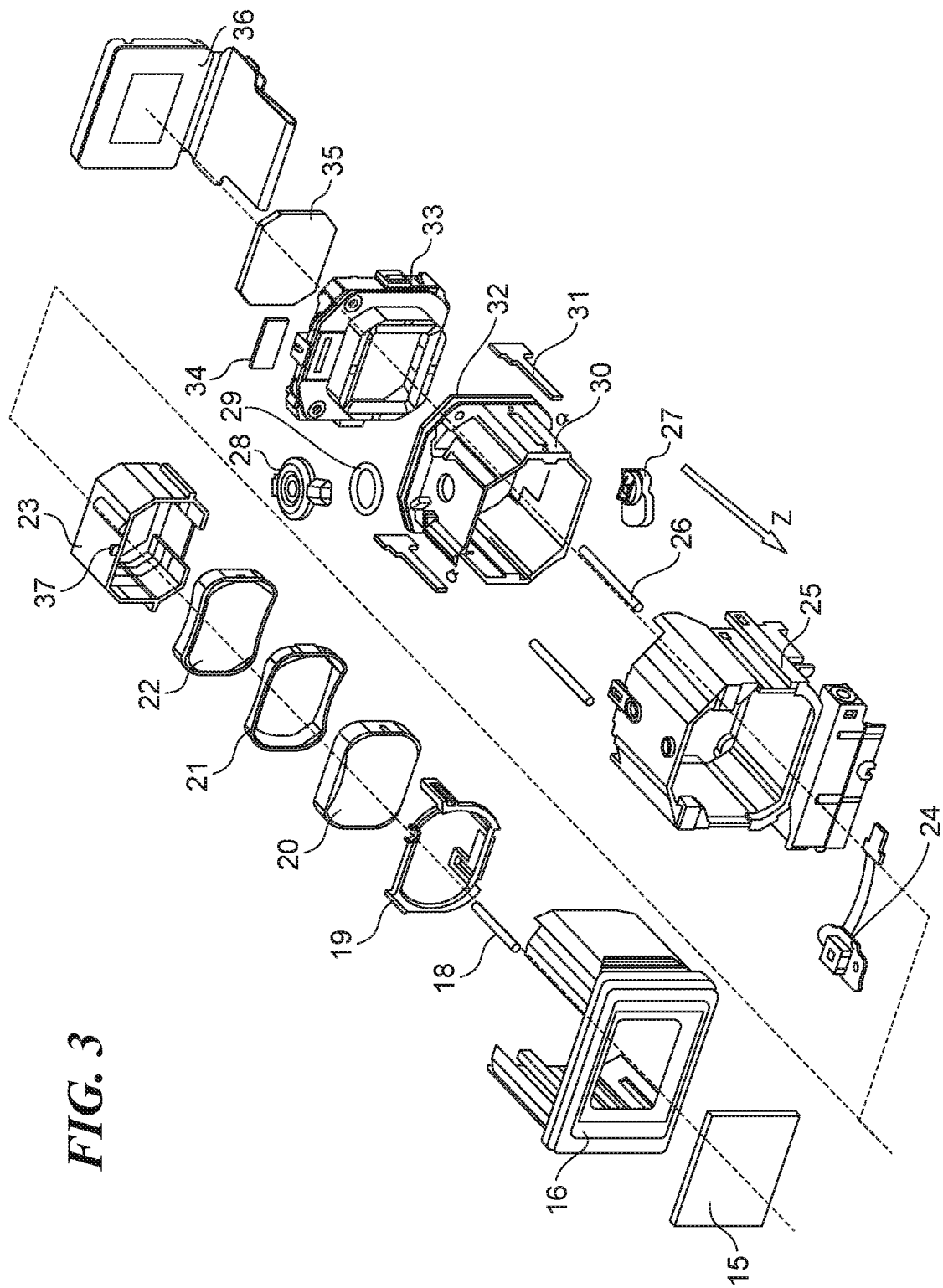
FIG. 3 is an exploded perspective view showing the finder unit of the image pickup apparatus in FIG. 1A.

FIG. 3 is an exploded perspective view showing the finder unit 14 of the image pickup apparatus 10 in FIG. 1A.

As shown in FIG. 3, the finder unit 14 is provided with the eyepiece glass 15, the eyepiece rubber 16 (a third barrel), a spring 18, a lens cover 19, a second lens 20, a mask 21, a first lens 22, a lens holder 23, and a detection switch 24 as components. Moreover, the finder unit 14 is provided with a fixed barrel 25 (a first barrel), a slide barrel 32 (a second barrel), a pair of plate springs 31, a pair of balls 30, a pair of guide bars 26, a cam 27, the visibility adjustment lever 28, and an O ring 29 as components. Furthermore, the finder unit 14 is provided with a panel cover 33, an aeration sheet 34, a dustproof glass 35, and a display panel 36.

The lens holder 23 holds the first lens 22 and the second lens 20. That is, the lens holder 23 is engaged with the lens cover 19 and securely holds the first lens 22, mask 21, and second lens 20 therebetween. A cam follower 37 is formed in the lens holder 23. A common optical axis of the first lens 22 and the second lens 20 is an optical axis of the finder unit 14.

Moreover, the finder unit 14 is provided with an opening for looking into an image displayed on the display panel 36. The eyepiece rubber 16 having an opening portion is arranged around the opening. The eyepiece rubber 16 (the third barrel) is formed by combining a base made from mold material like resin and an eyepiece section made from rubber. That is, the eyepiece rubber 16 is a two-color molded component made by combining two members. In order to prevent dust invading from the exterior and adhering to the lenses, the transparent eyepiece glass 15 is fixed to the eyepiece rubber 16 so as to close the opening portion.

Figure 4A:
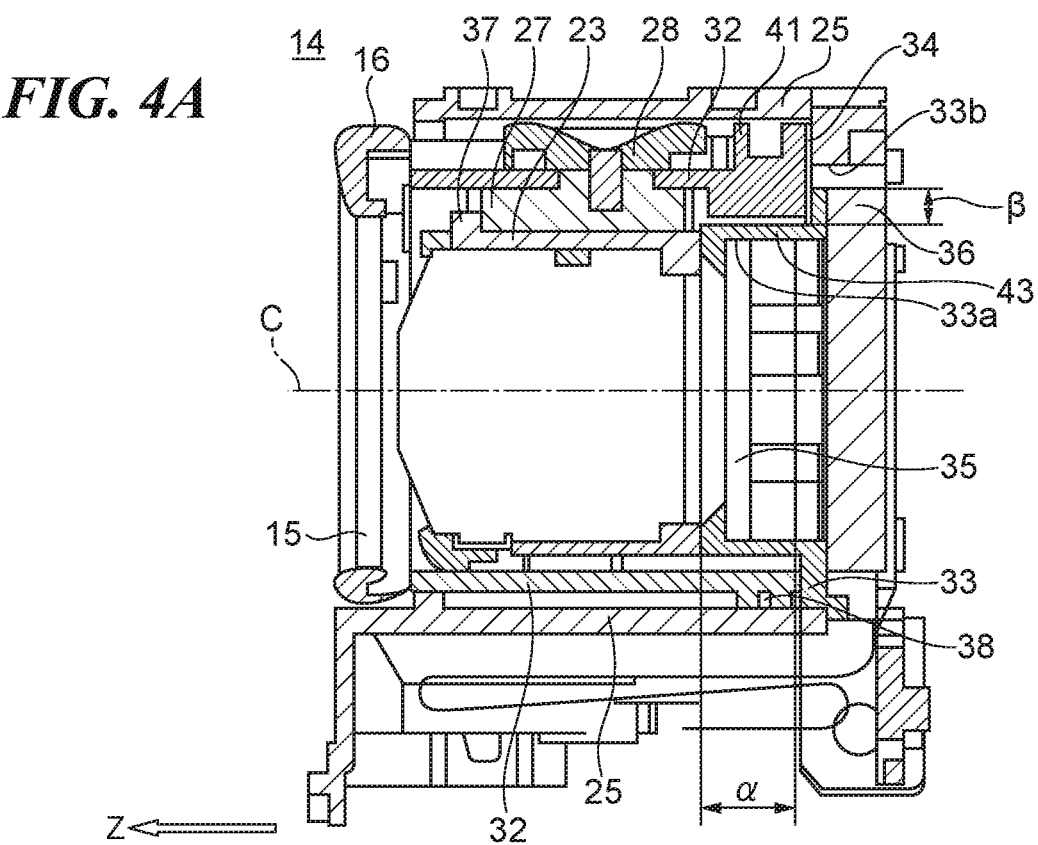
FIG. 4A and FIG. 4B are longitudinal sectional views showing the finder unit taken along an optical axis C.
Figure 4B:
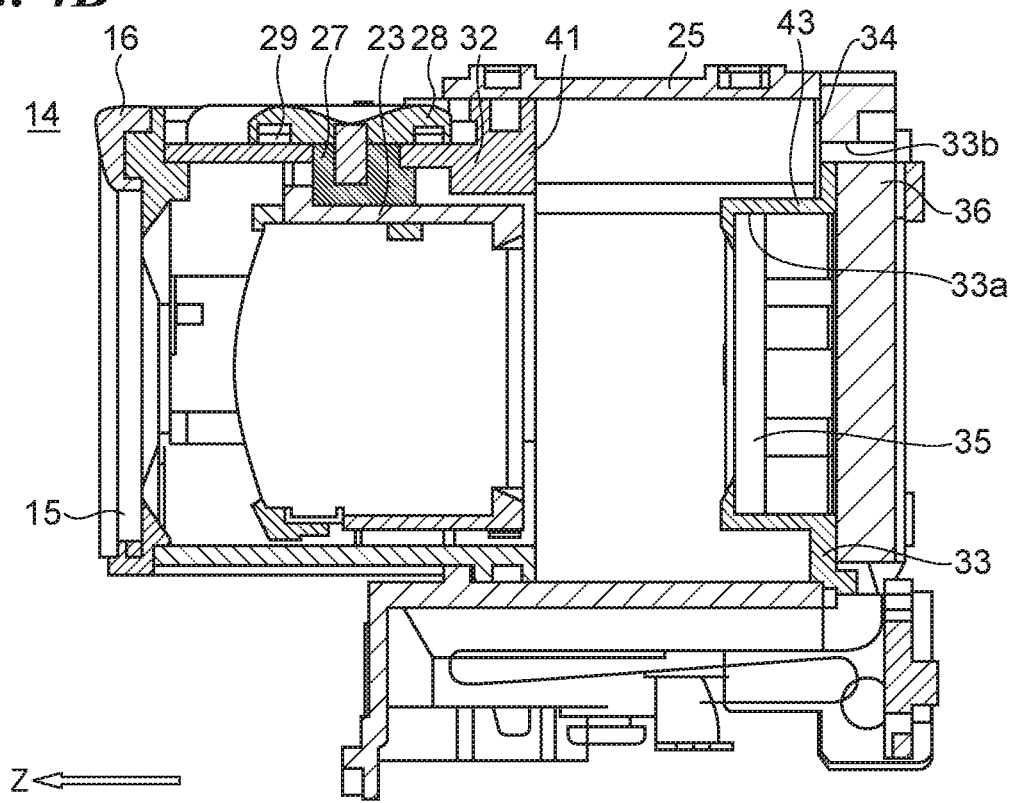

FIG. 4A and FIG. 4B are longitudinal sectional views showing the finder unit 14 taken along the optical axis C. FIG. 4A shows the stored state of the finder unit 14, and FIG. 4B shows the pulled-out state of the finder unit 14. The optical axis C of the finder unit 14 is approximately parallel to the Z direction.

The lens holder 23 holding the first and second lenses 22 and 20 is arranged inside the slide barrel 32 so as to be slidable with respect to the slide barrel in the Z direction. A guide groove for linearly guiding the lens holder 23 in the Z direction is formed on an internal surface of the slide barrel 32. The cam 27 that presses a cam follower 37 formed in the lens holder 23 is arranged in an upper portion of the slide barrel 32 (the second barrel).

The slide barrel 32 is arranged inside the fixed barrel 25 so as to relatively move with respect to the fixed barrel 25 in the Z direction (the optical axis direction). The fixed barrel 25 and the panel cover 33 are engaged with each other.

The eyepiece rubber 16 is connected to the slide barrel 32 by a snap fit connection. When a user pulls out the eyepiece rubber 16 in the +Z direction, three cylindrical members (the eyepiece rubber 16, slide barrel 32, and lens holder 23) are relatively moved integrally with respect to the fixed barrel 25, and the finder unit 14 goes in the pulled-out state (FIG. 1C, FIG. 2B). The details of the snap fit connection will be mentioned later.

A projected part 41 is formed around an outer periphery of the slide barrel 32 so as to be projected outwardly. The projected part 41 functions as a stopper at the time of pulling out the slide barrel 32. The projected part 41 is arranged at a front end in the −Z direction of the slide barrel 32. This arrangement lengthens an optical length from a display screen of the display panel 36 to the eyepiece glass 15 in the pulled-out state by pulling out the eyepiece rubber 16, which improves an optical performance. Moreover, a silicone rubber 38 (a sealing component) is arranged around the whole outer circumference of the slide barrel 32 including the projected part 41. The silicone rubber 38 enables the slide barrel 32 to slide while sealing a gap between the fixed barrel 25 and the slide barrel 32. Although the silicone rubber 38 is employed as the sealing component, another material may be employed as long as the gap between the fixed barrel 25 and the slide barrel 32 is sealed.

The display panel 36 is securely supported by the panel cover 33. The panel cover 33 has an opening 33a for looking into an image displayed on the display panel 36. In order to prevent dust invading from the exterior and adhering to the display panel 36, the dustproof glass 35 is fixed to the panel cover 33 from the side of the display panel 36 so as to close the opening 33a. Such a configuration achieves a sealing structure that prevents dust invading into a space between the dustproof glass 35 and the display panel 36.

Moreover, an air vent 33b that connects the exterior and the inside of the finder unit 14 is provided in the panel cover 33. The air vent 33b is covered by the aeration sheet 34. The aeration sheet 34 is a sheet member with breathability and prevents passage of a particle like dust more than 1 micrometer, for example. Such a configuration prevents suction of dust through the air vent 33b, when a user pulls out the finder unit 14.

Figure 5:
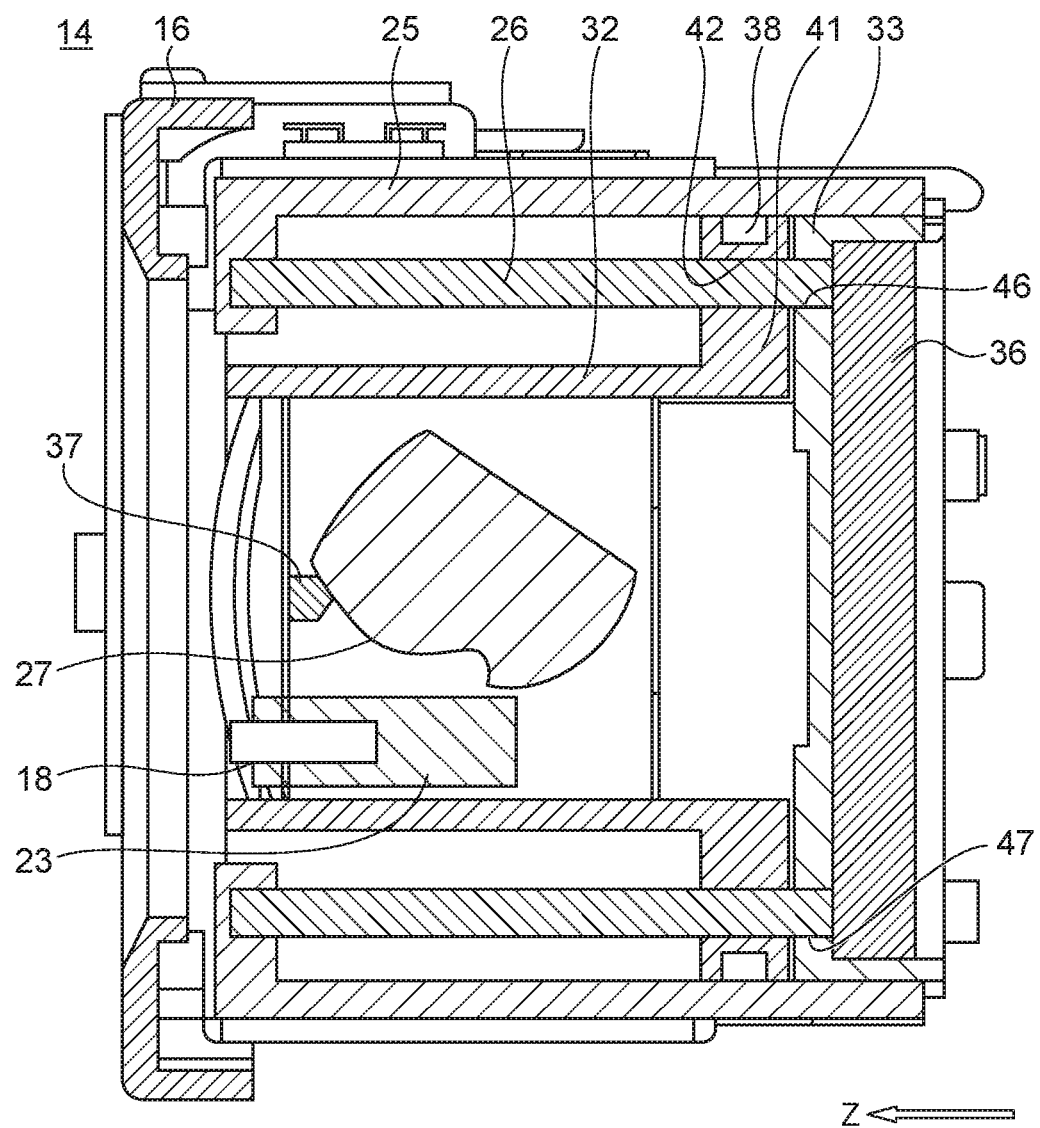
FIG. 5 is a cross sectional view showing the finder unit at a guide bar position in a stored state.

FIG. 5 is a cross sectional view showing the finder unit 14 at a guide bar position in a stored state. As shown in FIG. 5, the spring 18 that pushes the cam follower 37 of the lens holder 23 to the cam 27 is provided between the eyepiece rubber 16 and the lens holder 23. The cam follower 37 is pushed to the cam 27 because the spring 18 pushes the lens holder 23 in the −Z direction. A user is able to relatively move the lens holder 23 with respect to the slide barrel 32 in the Z direction (the optical axis direction) by moving the visibility adjustment lever 28 in the pulled-out state of the finder unit 14. A user is able to look at an image displayed on the display panel 36 without blurring by moving the visibility adjustment lever 28 so as to adjust the visibility of the finder unit 14 according to a user's eyesight.

Since the visibility adjustment lever 28 is operable only in the pulled-out state (FIG. 2B), unintentional change of the visibility adjusted by a user can be avoided.

The two guide bars 26 that are guide members for slide movement of the slide barrel 32 are supported by inserting in holes 46 and 47 formed in the panel cover 33 at one side and are supported by inserting in holes formed in the fixed barrel 25 (the first barrel) at the other side. That is, the guide bars 26 are arranged between the fixed barrel 25 and the panel cover 33 in approximately parallel to the optical axis, and are supported by the fixed barrel 25 and the panel cover 33 in a double-held state. It should be noted that guide holes 42 through which the guide bars 26 penetrates are formed in the projected part 41 of the slide barrel 32.

Since the slide barrel 32 moves in the Z direction (the optical axis direction) with respect to the fixed barrel 25 along with the guide bars 26 that are fixed in the double-held state, the slide barrel 32 moves with sufficient accuracy.

Figure 6:
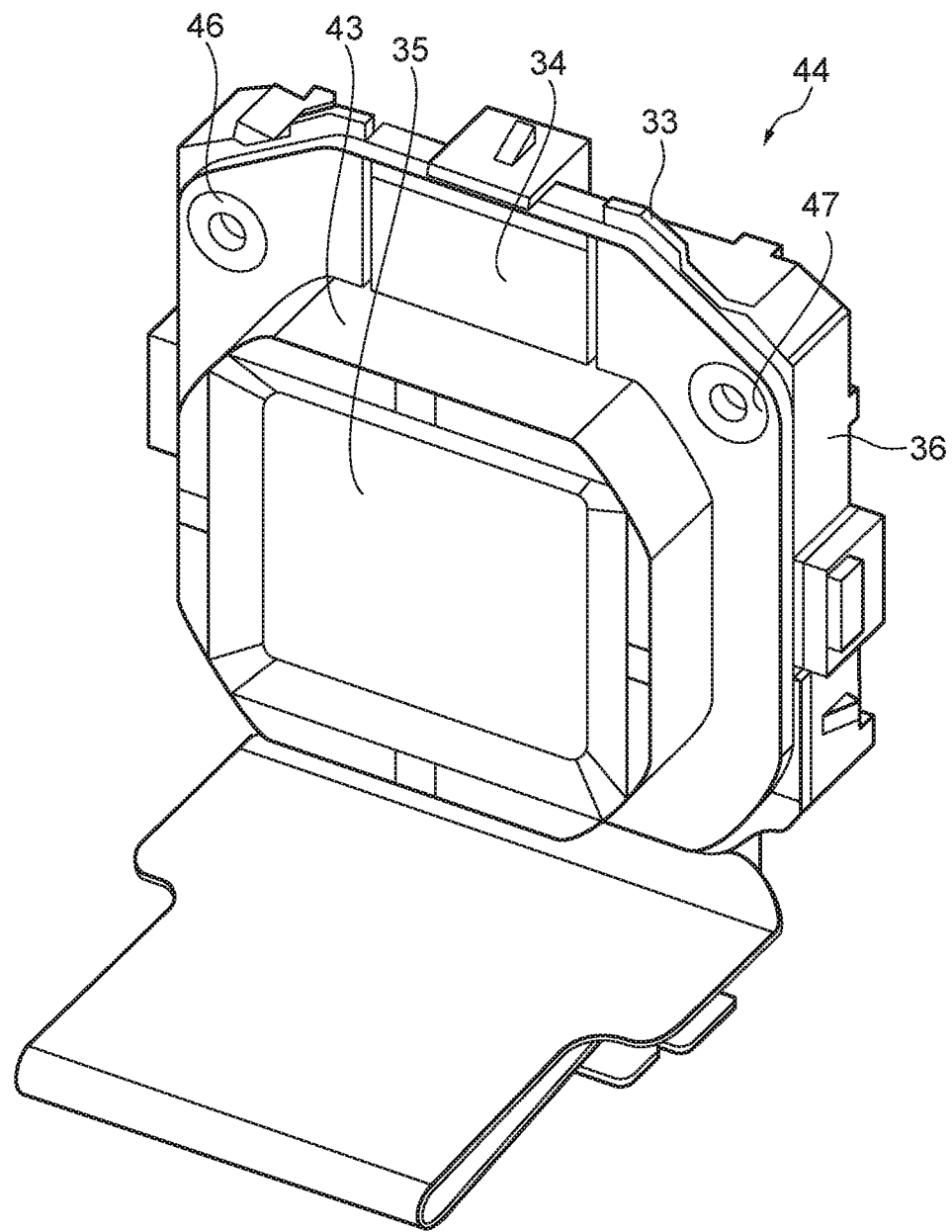
FIG. 6 is a perspective view showing a panel unit that constitutes a part of the finder unit.

FIG. 6 is a perspective view showing a panel unit 44 that constitutes a part of the finder unit 14.

As shown in FIG. 6, the panel unit 44 as an image display unit is constituted by unitizing the panel cover 33, the dustproof glass 35, etc. The panel unit 44 mainly has a portion holding the display panel 36 and a convex part 43 holding the dustproof glass 35.

The finder unit 14 has the two balls 30 besides the two guide bars 26.

Figure 7:
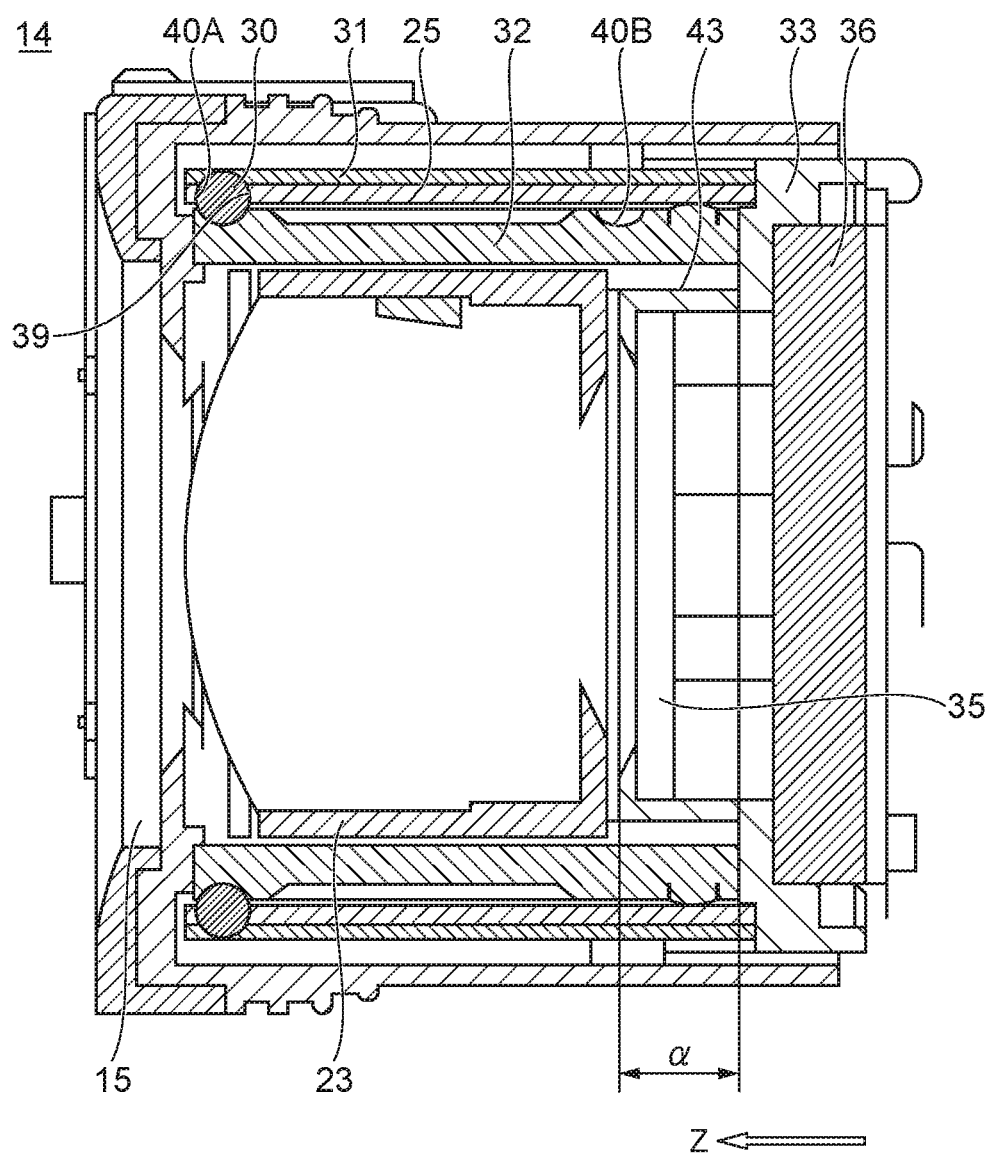
FIG. 7 is a cross sectional view showing the finder unit at a position of balls in the stored state.

FIG. 7 is a cross sectional view showing the finder unit 14 at a position of balls 30 in the stored state. As shown in FIG. 7, ball holes 39 are formed in the fixed barrel 25. Then, ball grooves 40A and 40B are formed on the outer circumference of the slide barrel 32 at two positions that are separated in the optical axis direction. The plate springs 31 push the balls 30 inwardly in a direction that intersects perpendicularly with the optical axis. The balls 30 that are held by the ball holes 39 roll on the outer surface of the slide barrel 32 with the slide movement of the slide barrel 32 with respect to the fixed barrel 25. And the slide barrel 32 can be regulated at two stable positions in the optical axis direction at which the balls 30 pushed by the plate springs 31 fit in the ball grooves 40A and 40B. That is, when the balls 30, which are held by the boll holes 39 and are pushed by the plate springs 31, fit in the ball groove 40A, the finder unit 14 is regulated in the stored state shown in FIG. 7. In the meantime, when the balls 30, which are held by the boll holes 39 and are pushed by the plate springs 31, fit in the ball groove 40B, the finder unit 14 is regulated in the pulled-out state.

Next, the snap fit connection in the embodiment will be described in detail. The snap fit connection of the embodiment is one kind of mechanical connection methods used for connections of members made from metal or plastic, and is a method to connect members by fitting using elasticity of members.

Figure 8A:
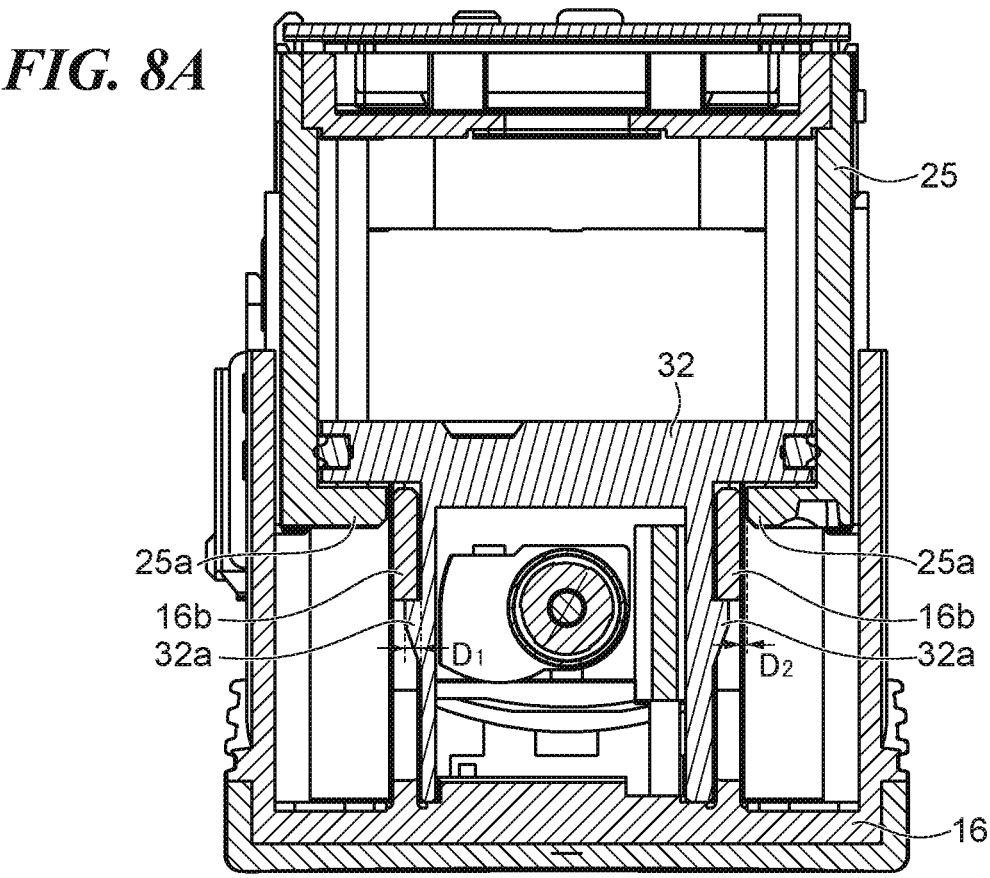
FIG. 8A and FIG. 8B are longitudinal sectional views showing a snap fit portion of the finder unit.
Figure 8B:
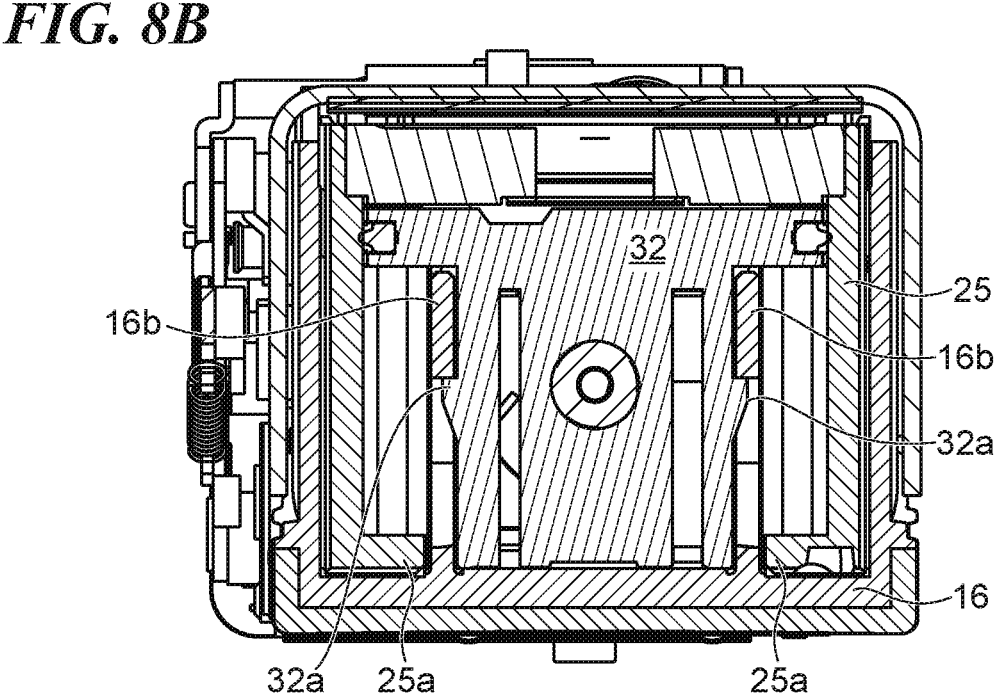
Figure 9:
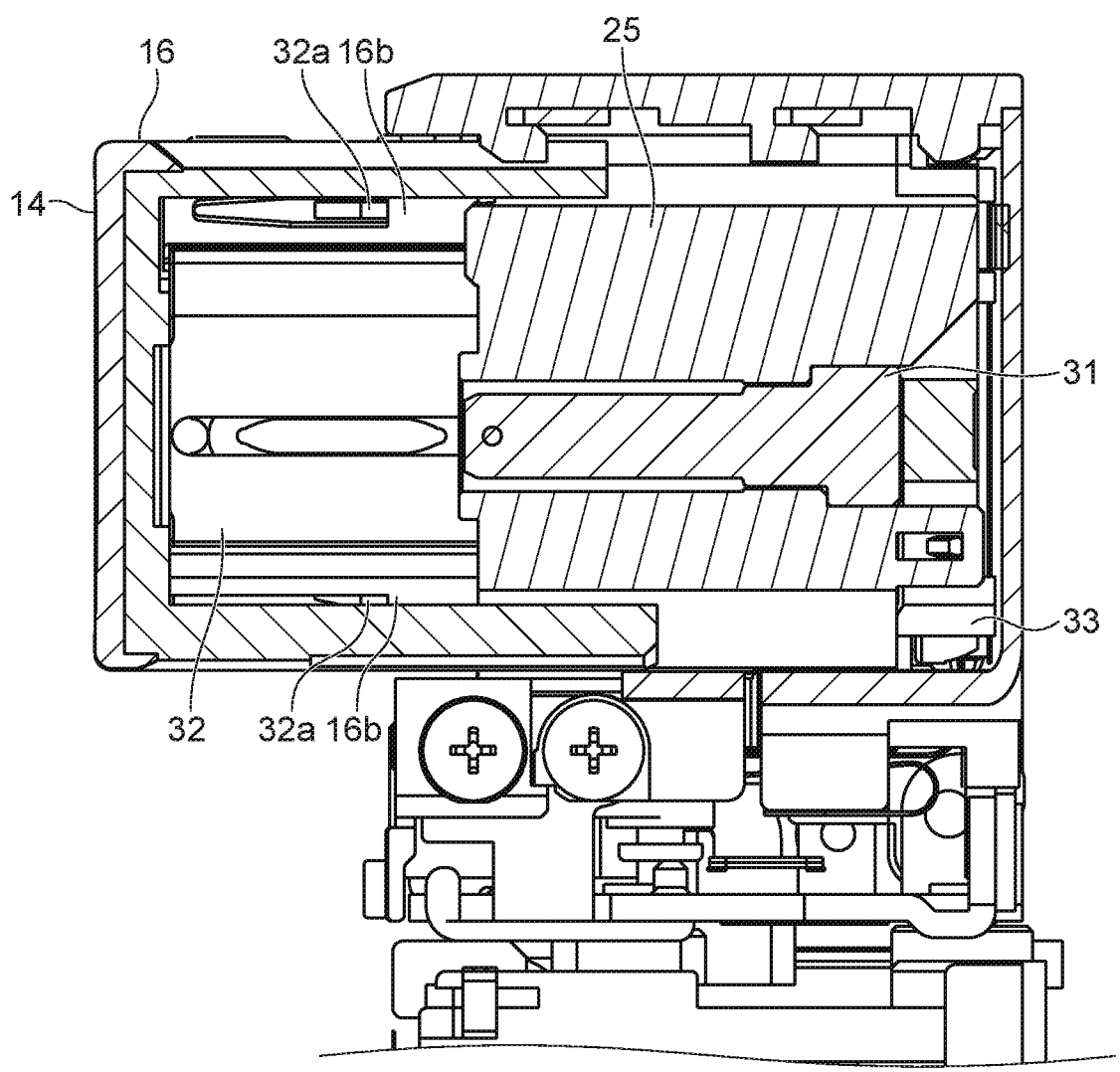
FIG. 9 is a longitudinal sectional view showing the finder unit taken along a plate spring in a pulled-out state.

FIG. 8A and FIG. 8B are longitudinal sectional views showing a snap fit portion of the finder unit 14. FIG. 8A shows the pulled-out state of the finder unit 14 and FIG. 8B shows the stored state of the finder unit 14. FIG. 9 is a longitudinal sectional view showing the finder unit 14 taken along the plate spring 31 in the pulled-out state.

The fixed barrel 25 is connected with the slide barrel 32 so as to be slidable in the optical axis direction. The fixed barrel 25 is provided with ribs 25a at an end of the connection with the slide barrel 32 so as to be projected from the connection end inwardly toward the optical axis C. The ribs 25a function as fastening parts that fasten snap-fit-connection parts. Locking parts 32a for the snap fit connection are provided in the outer circumference of the slide barrel 32. Moreover, the eyepiece rubber 16 provides an extended part that is extended from the eyepiece section in the −Z direction. Hooks 16b are provided in the extended part. The hook 16b is a member for the snap fit connection and has a long hole as shown in FIG. 9. When the eyepiece rubber 16 is fit to the slide barrel 32 by decreasing a mutual relative distance, the hook 16b of the eyepiece rubber 16 deforms elastically. When the hook 16b deforms elastically and overcomes the locking part 32a of the slide barrel 32, the elastic deformation of the hook 16b returns to the state before the deformation, and the locking part 32a fit in the long hole, and the snap fit connection is completed.

The eyepiece rubber 16 (eyepiece cover) is configured so that the inside snap fit portions tend to open when the outer side of the eyepiece rubber 16 is sagged. At the time of assembly, the finder unit 14 is in the stored state as shown in FIG. 8B where the snap fit connection will be relatively easily released. In the meantime, when the finder unit 14 is in the pulled-out state as shown in FIG. 8A, the tip of the hook 16b is nipped between the slide barrel 32 and the rib 25a of the fixed barrel 25. Accordingly, the hook 16b cannot overcome the locking part 32a of the slide barrel 32 in the pulled-out state, even if the hook deforms elastically, and the snap fit connection is not released.

As shown in FIG. 8A, it is preferable that an engagement width D1 be more than a gap D2 (D1>D2) in the pulled-out state of the finder unit 14. The engagement width D1 represents a range in which the hook 16b of the eyepiece rubber 16 contacts the locking part 32a of the slide barrel 32. The gap D2 represents a space between the hook 16b of the eyepiece rubber 16 and the front end of the rib 25a of the fixed barrel 25. As a result of this, the snap fit connection between the eyepiece rubber 16 and the slide barrel 32 is held and becomes hard to be released even if the eyepiece rubber 16 sags.

In the embodiment, a space between the snap-fit-connection part and the internal surface of the fixed barrel 25 in the pulled-out state of the finder unit 14 is configured to become narrower than a space between the snap-fit-connection part and the internal surface of the fixed barrel 25 in the stored state of the finder unit 14. This particularly improves the effect of preventing the release of the snap fit connection in the pulled-out state of the finder unit 14.

Next, a power-saving measure in the digital camera 10 will be described.

The detection switch 24 that detects whether the finder unit 14 is pulled out is provided in the finder unit 14, and the detection switch 24 is fixed to the fixed barrel 25.

Figure 10A:
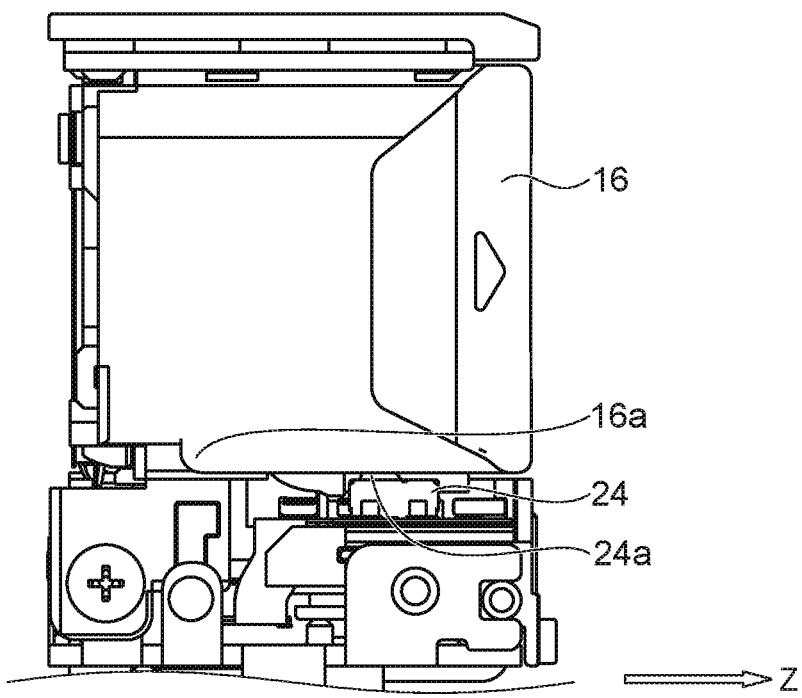
FIG. 10A and FIG. 10B are views for describing a detection switch of the image pickup apparatus.
Figure 10B:
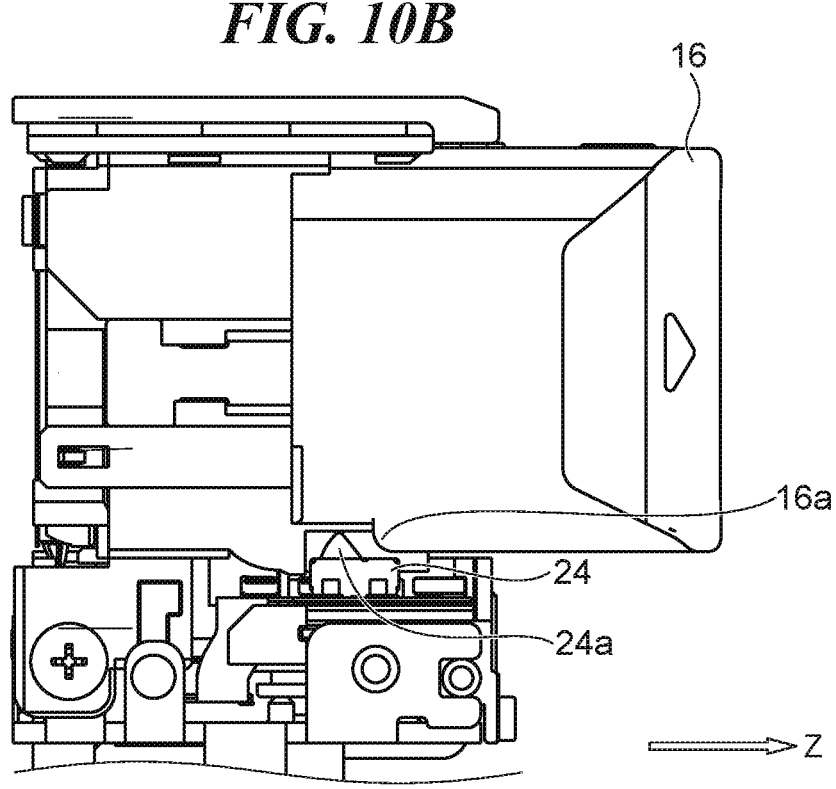

FIG. 10A and FIG. 10B are views for describing the detection switch in the image pickup apparatus. FIG. 10A shows the stored state of the finder unit 14, and FIG. 10B shows the pulled-out state (a using state) of the finder unit 14. The detection switch 24 is provided with a plunger 24a that is energized upwardly by a function of an elastic member. When the plunger 24a is pushed in, the detection switch 24 turns ON. When the plunger 24a is released, the plunger projects and the detection switch 24 turns OFF.

As shown in FIG. 10A a step 16a is provided in the lower part of the eyepiece rubber 16. In the stored state of the finder unit 14, the plunger 24a of the detection switch 24 is pushed downwardly by the step 16a, and the detection switch 24 turns ON.

In the meantime, as shown in FIG. 10B, in the pulled-out state of the finder unit 14, the plunger 24a of the detection switch 24 is projected upwardly, and the detection switch 24 turns OFF. In this way, the detection switch 24 detects whether the finder unit 14 is in the stored state or the pulled-out state by using the step 16a of the eyepiece rubber 16.

Figure 11:
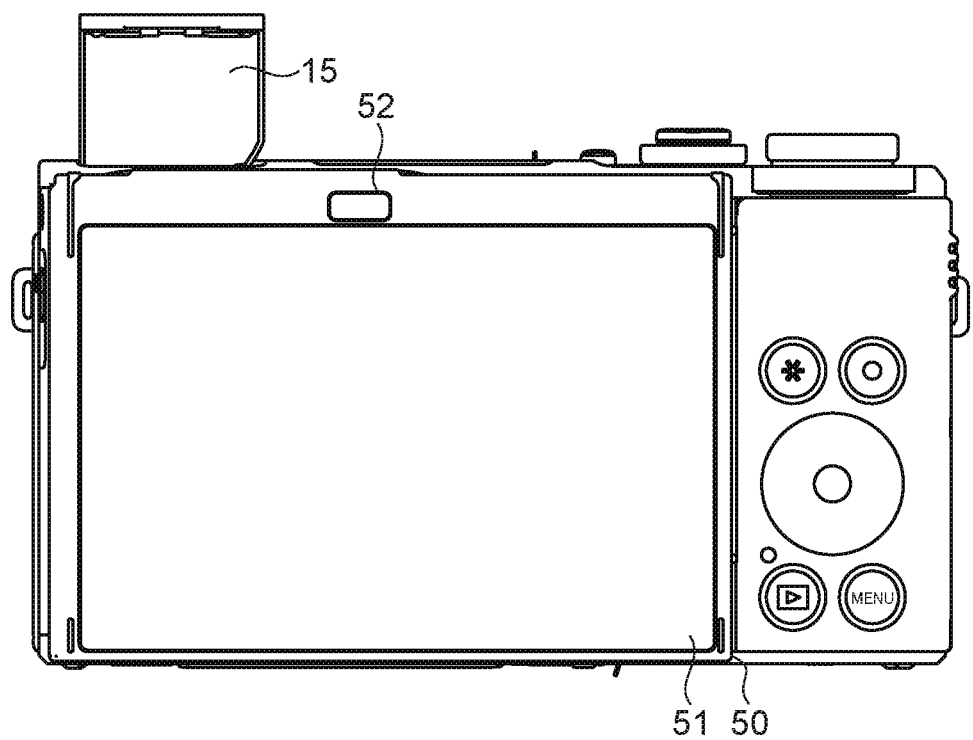
FIG. 11 is a rear view showing the image pickup apparatus.

FIG. 11 is a rear view showing the image pickup apparatus. An LCD unit 50 is arranged at the back face of the digital camera 10. An eye sensor 52 as an eye-contact detection sensor is attached to the upper portion of the LCD unit 50. The eye sensor 52 turns ON when a user's face approaches, and detects that the user looks into the finder unit 14.

In the stored state of the finder unit 14, an image is displayed only on an LCD panel 51 in the LCD unit 50. In the meantime, even if the finder unit 14 is popped up and is pulled out to the user side and the detection switch 24 turns OFF, an image is not displayed on the finder unit 14 and is displayed only on the LCD panel 51 of the LCD unit 50 during the eye sensor 52 is OFF.

That is, the digital camera 10 displays an image only on the finder unit 14, when the finder unit 14 is in the pulled-out state where the detection switch 24 is OFF and when the eye sensor 52 turns ON because the user's face approaches. In this way, power saving is achieved by limiting the display screen to either one of the finder unit 14 and the LCD panel 51.

Figure 12:
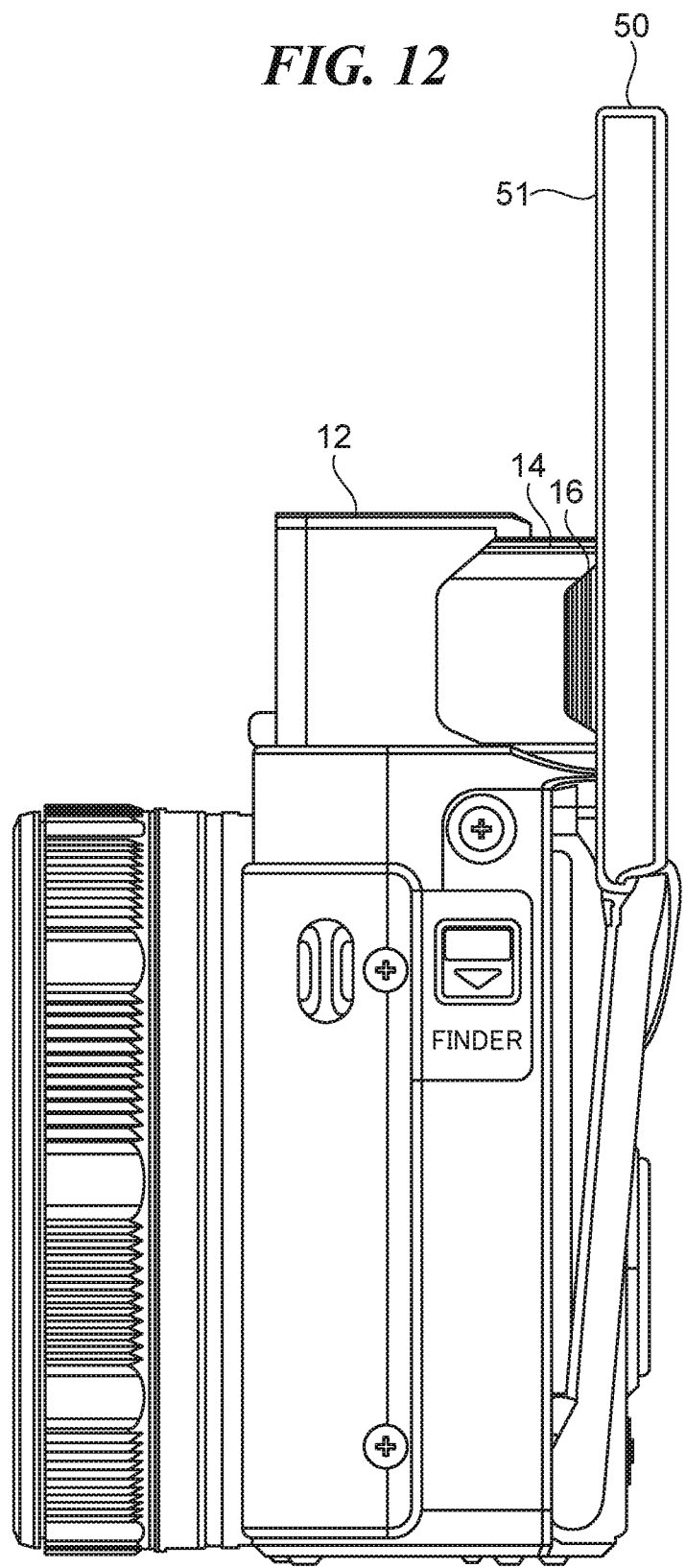
FIG. 12 is a side view showing the image pickup apparatus in a state where an LCD unit is tilted by 180 degrees.

FIG. 12 is a side view showing the image pickup apparatus in a state where the LCD unit 50 is tilted by 180 degrees.

As shown in FIG. 12, when the LCD panel 51 tilts (inclines) together with the LCD unit 50, the finder unit 14 is pushed by the LCD panel 51 in a storing direction. Accordingly, when the LCD panel 51 of the LCD unit 50 tilts, the finder unit 14 is pushed by the LCD panel 51 and goes into the stored state, which turns the detection switch 24 ON. When it is detected that the finder unit 14 goes into the stored state according to a signal from the detection switch 24, the display of an image on the finder unit 14 is stopped and an image is displayed on the LCD panel 51. Moreover, when the finder unit 14 is in the stored state, the power of the eye sensor 52 is also turned off because the detection of the face approach by the eye sensor becomes unnecessary. As a result of this, power saving is achieved by disconnecting the image display on the finder unit 14 that is not in the using state and by disconnecting the unnecessary power supply to the eye sensor 52. It should be noted that the LCD panel 51 maintains a displaying state that displays an image in this case.

Next, a miniaturization measure of the digital camera 10 will be described.

Figure 13A:
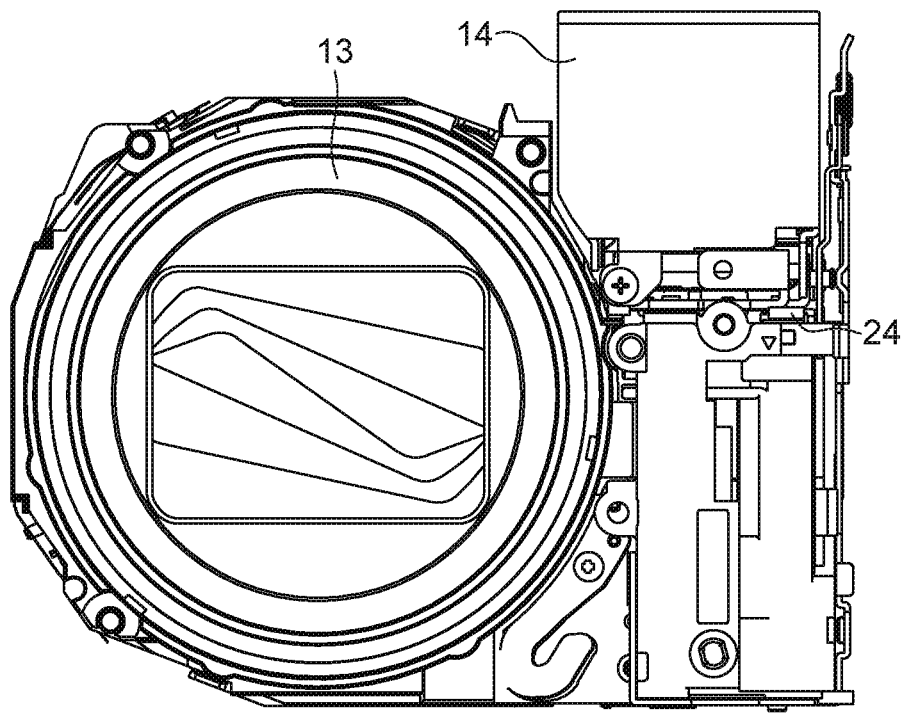
FIG. 13A and FIG. 13B are views showing positional relationships of a lens barrel unit, the finder unit, and a detection switch.
Figure 13B:
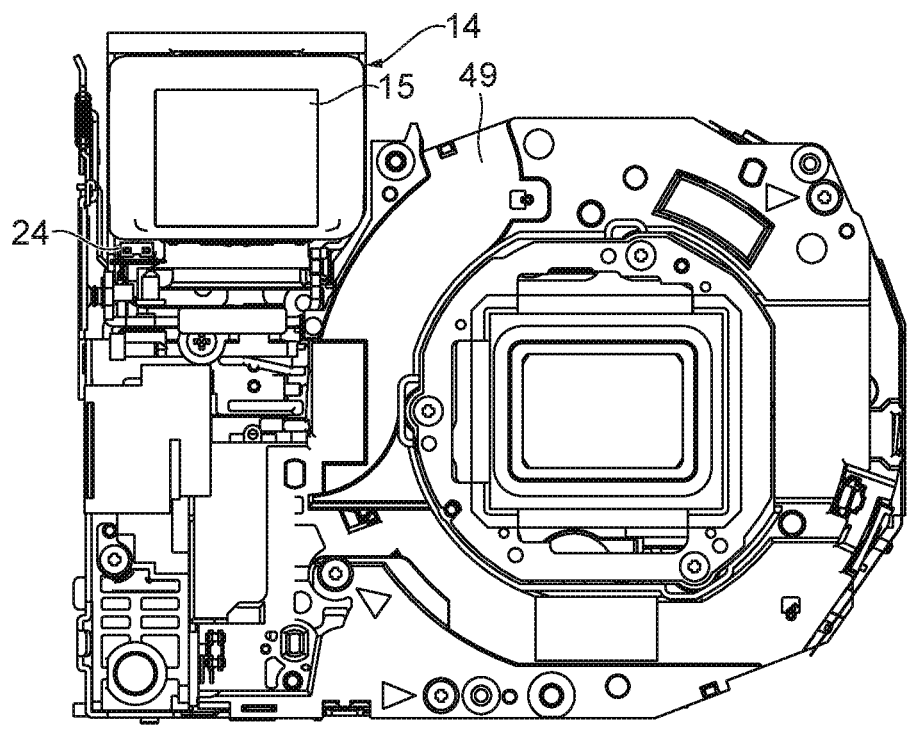

FIG. 13A and FIG. 13B are views showing the positional relationships of the lens barrel unit 13, the finder unit 14, and the detection switch 24. FIG. 13A is a view showing the camera body viewed from an object side. FIG. 13B is a view showing the camera body viewed from the image pickup surface side.

As shown in FIG. 13A and FIG. 13B, the detection switch 24 that detects the stored state of the finder unit 14 is arranged inside the fixed barrel 25 at a position that is closer to an exterior side surface and is apart from the lens barrel unit 13. Since a position of a wiring of an electronic view finder in the finder unit 14 is close to the detection switch 24, it becomes advantageous in wiring.

Moreover, as shown in FIG. 13B, a sensor holder 49 has the largest outline in the lens barrel unit 13 and is arranged at the back side in the +Z direction. The sensor holder 49 and the finder unit 14 are adjacent to each other in an oblique direction in FIG. 13B. If the detection switch 24 is arranged between the lens barrel unit 13 and the finder unit 14, the distance between the lens barrel unit 13 and the finder unit 14 will become large and the entire size of the camera will become large as a result. Accordingly, the detection switch 24 is arranged at the position under the finder unit 14 that is apart from the sensor holder 49 of the lens barrel unit 13 and is closer to the exterior side surface of the camera body in the embodiment. This miniaturizes the camera as a whole.

Hereinafter, merits of arranging the detection switch 24 at the position under the finder unit 14 that is apart from the sensor holder 49 of the lens barrel unit 13 and is closer to the exterior side surface of the camera body will be described using schematic views.

Figure 14A:
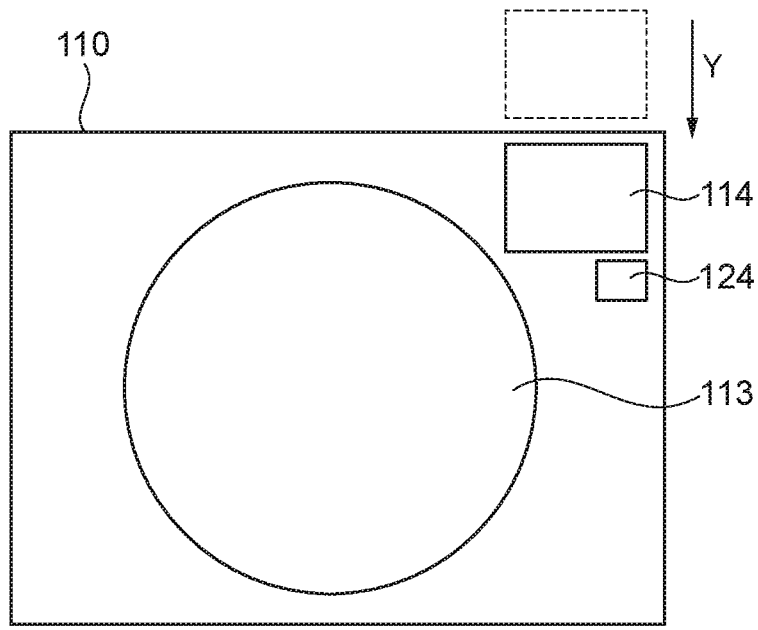
FIG. 14A and FIG. 14B are schematic views showing positional relationships between a lens barrel unit, a finder unit, and a detection switch.
Figure 14B:
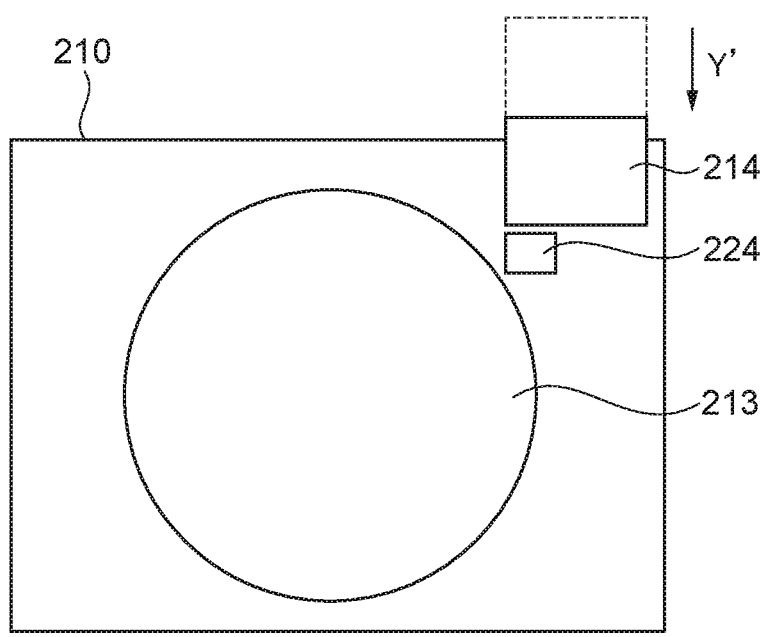

FIG. 14A and FIG. 14B are schematic views showing positional relationships between a lens barrel unit 113, a finder unit 114, and a detection switch 124. FIG. 14A shows the embodiment and FIG. 14B shows a comparative example. As shown in FIG. 14A, the lens barrel unit 113 is arranged in the center of a digital camera 110, the finder unit 114 is arranged at a right-upper space in the drawing, and the detection switch 124 is arranged under the finder unit 114 at a side closer to an exterior side surface. In FIG. 14A, a broken-line part above the right side of the digital camera 110 shows a position of the finder unit 114 in the pulled-out state in which the finder unit 114 is popped up. An arrow Y shows a direction and distance of a push down operation for the finder unit 14.

In the meantime, a detection switch 224 in FIG. 14B is arranged at a position closer to a lens barrel unit 213. The lens barrel unit 213 is arranged in the center of a digital camera 210, a finder unit 214 is arranged at a right-upper space in the drawing, and the detection switch 224 is arranged under the finder unit 214 at a side closer to the lens barrel unit 213. A broken-line part above the right side of the digital camera 210 shows a position of the finder unit 214 in the pulled-out state in which the finder unit 214 is popped up. An arrow Y shows a direction and distance of a push down operation for the finder unit 214.

In the arrangement in FIG. 14B where the detection switch 224 is arranged under the finder unit 214 at the side closer to the lens barrel unit 213, the distance of the push down operation for the finder unit 214 represented by the arrow Y' is shorter than the distance represented by the arrow Y in FIG. 14A. As a result, the finder unit 214 cannot be stored in the camera body completely. Accordingly, the arrangement in FIG. 14B needs to enlarge the entire size of the camera in order to store the finder unit 214 in the camera body completely. As compared with this, since the embodiment where the detection switch 124 is arranged at the position shown in FIG. 14A is able to take a long distance for the push down operation for the finder unit, it does not need to enlarge the entire size of the camera and achieves miniaturization.

Figure 15:
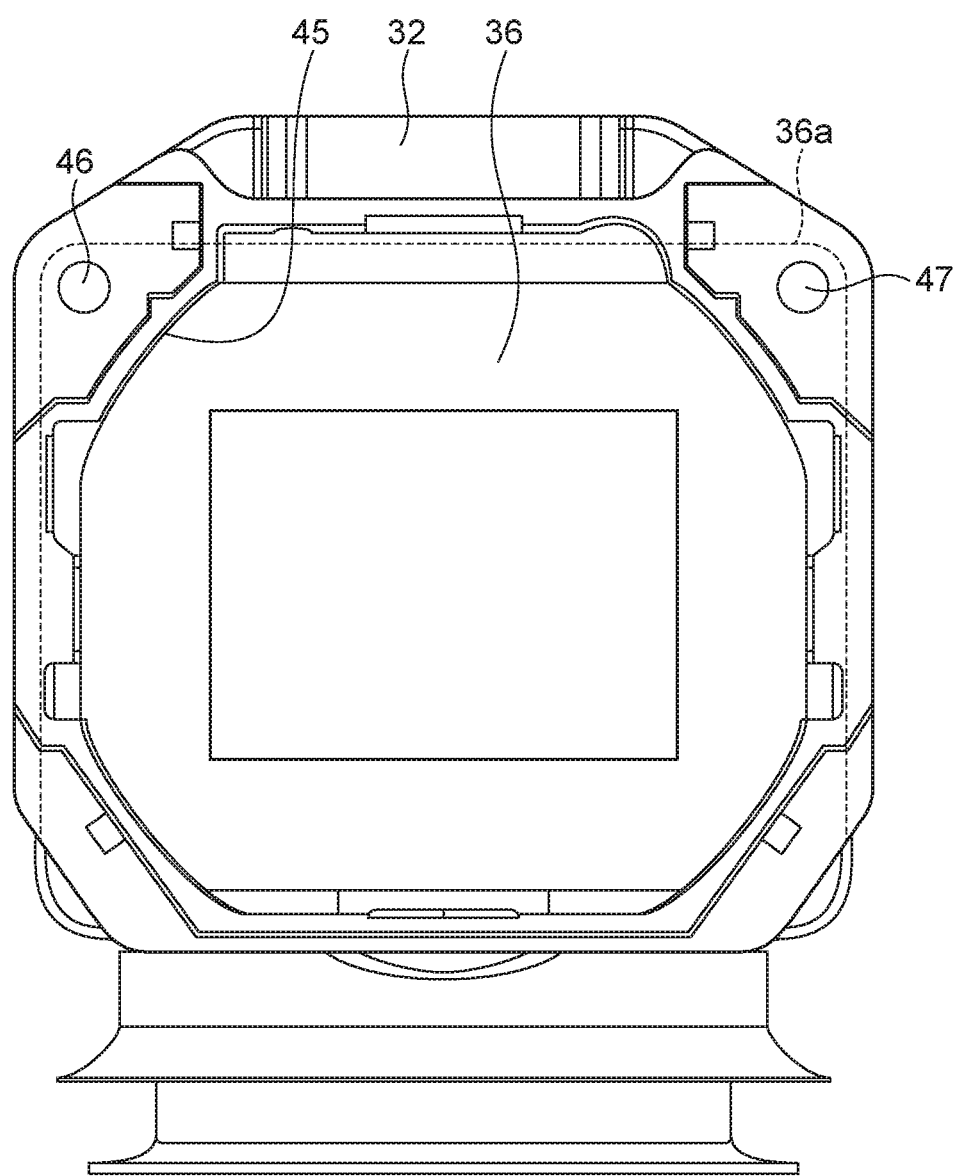
FIG. 15 is a view showing a slide barrel and a display panel viewed from a +Z side in an optical axis direction.

FIG. 15 is a view showing the slide barrel 32 and the display panel 36 viewed from a +Z side in the optical axis direction.

As shown in FIG. 15, the holes 46 and 47 for supporting the guide bars 26 are located inside a projection plane of the finder unit 14. That is, the holes are located inside an outline 36a of the display panel 36 when viewed in the optical axis direction. The two guide bars 26 supported by the holes 46 and 47 are also located inside the outline 36a when viewed in the optical axis direction. Moreover, an inner periphery 45 of the slide barrel 32 is kept inside the outline 36a when viewed in the optical axis direction. Such arrangements contribute to the miniaturization of the digital camera 10 in a direction vertical to the optical axis direction.

Moreover, the digital camera 10 is configured so that a part of the slide barrel 32 overlaps with a part of the panel cover 33 in the optical axis direction when the finder unit 14 is shifted to the stored state from the pulled-out state. That is, the slide barrel 32 and the convex part 43 of the panel cover 33 are overlapped in a range of a length α in the optical axis direction (Z direction) in the stored state (see FIG. 7). In this way, the finder unit 14 is miniaturized by the length α because the slide barrel 32 is located around the convex part 43 in the stored state.

As compared with this, if the panel cover 33 does not have the convex part 43, the camera cannot be miniaturized as a whole.

Figure 16:
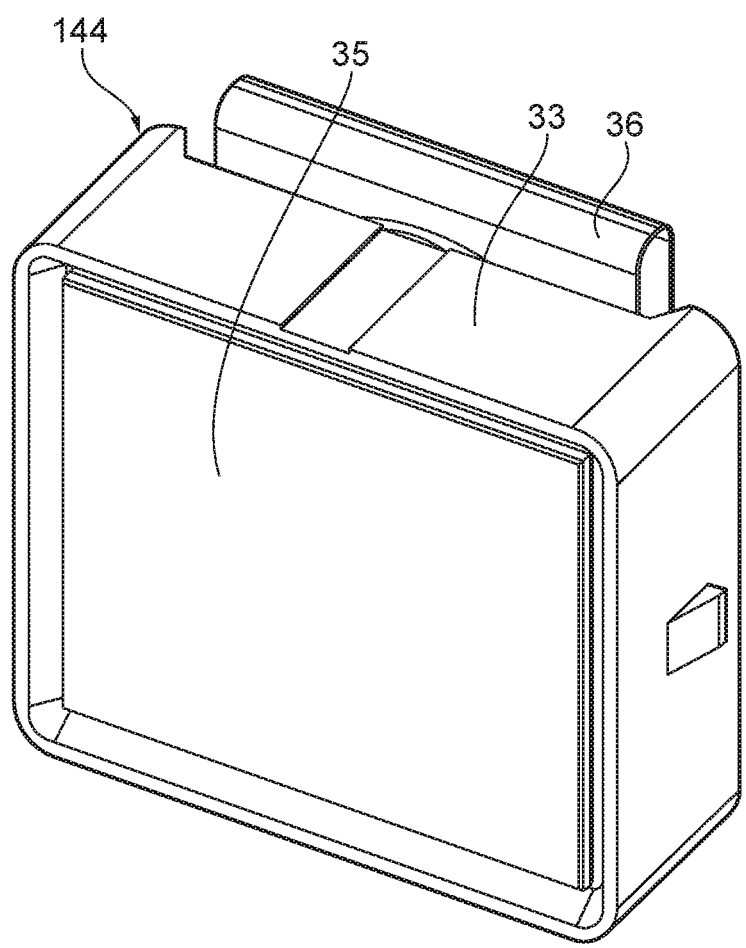
FIG. 16 is a perspective view showing a panel unit in an image pickup apparatus of a comparative example.

FIG. 16 is a perspective view showing a panel unit of a comparative example in which the panel cover 33 does not have the convex part 43. As shown in FIG. 16, the finder unit 144 has a flat shape in which the panel cover 33 is formed without the convex part 43 around the dustproof glass 35. Accordingly, since the slide barrel 32 and the panel cover 33 cannot be overlapped in the optical axis direction, the camera body cannot be miniaturized.

Moreover, the air vent 33b for aeration of the panel cover 33 is formed in the position more distant than the dustproof glass 35 from the optical axis C in the embodiment as shown in FIG. 4A and FIG. 4B. That is, the aeration sheet 34, which covers the air vent 33b, is also arranged at the position more distant than the dustproof glass 35 provided in the convex part 43 from the optical axis C. Moreover, the aeration sheet 34 is arranged at the position that overlaps with the visibility adjustment mechanism (the cam 27, visibility adjustment lever 28, and O ring 29) when viewed in the optical axis C. These arrangements contribute to the miniaturization of the finder unit 14 in the optical axis direction.

Moreover, the aeration sheet 34 is arranged outside the convex part 43 so as to face the projected part 41 (FIG. 4A and FIG. 4B), and is perpendicular to the optical axis direction that is the movement direction of the slide barrel 32.

The aeration sheet 34 is pasted on the panel cover 33 so as to cover the air vent 33b from the side of the dustproof glass 35 in the optical axis direction. Accordingly, as compared with a case where the aeration sheet 34 is pasted from the opposite side that is the side of the display panel 36, a larger arrangement area of the aeration sheet 34 is ensured by a range of a length β (FIG. 4A) in which the aeration sheet 34 overlaps with the display panel 35 when viewed in the optical axis direction. Moreover, the aeration sheet 34 overlaps with the display panel 36 when viewed in the optical axis direction. Furthermore, the aeration sheet 34 is located between the holes 46 and 47 for supporting the two guide bars 26, i.e., between the two guide bars 26, in the direction vertical to the optical axis direction (see FIG. 6). These arrangements enable effective utilization of a space, which enlarges the area of the aeration sheet 34 without enlarging the finder unit 14. Particularly, the finder unit 14 is miniaturized in the direction that intersects perpendicularly with the optical axis C.

According to the embodiment, the ribs 25a that supports the snap-fit-connection part between the eyepiece rubber 16 and the slide barrel 32 inwardly from the outside are provided in the fixed barrel 25 at the end of the connection with the slide barrel 32. This suppresses the release of the snap fit connection in the pulled-out state of the finder unit 14 and does not suppress the release of the snap fit connection in the stored state. Accordingly, the release of the snap fit connection is suppressed in the pulled-out state of the finder unit 14 while keeping the ease of assembly in the stored state of the finder unit 14.

In the embodiment, it is preferable that an engagement width D1 be more than a gap D2 (D1>D2) in the pulled-out state of the finder unit 14. The engagement width D1 represents a range in which the hook 16b of the eyepiece rubber 16 contacts the locking part 32a of the slide barrel 32. The gap D2 represents a space between the hook 16b of the eyepiece rubber 16 and the front end of the rib 25a of the fixed barrel 25. As a result of this, the snap fit connection between the eyepiece rubber and the slide barrel 32 is held effectively and becomes hard to be released.

Moreover, in the embodiment, a space between the snap-fit-connection part and the internal surface of the fixed barrel 25 in the pulled-out state of the finder unit 14 is configured to become narrower than a space between the both in the stored state of the finder unit 14. This particularly improves the effect of preventing the release of the snap fit connection in the pulled-out state of the finder unit 14.

Although the embodiment of the present invention has been described using the image pickup apparatus, the present invention is not restricted to the specific embodiment and various configurations that do not deviate from the gist of the present invention are also included in the present invention. That is, the characteristic configuration of the present invention is applicable to apparatuses other than the image pickup apparatus. For example, the above-mentioned characteristic configuration of the present invention is applicable to an apparatus other than an image pickup apparatus as long as the other apparatus is configured to have a unit that has a connection part by the snap fit connection and changes its position.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-013023, filed Jan. 29, 2019, which is hereby incorporated by reference herein in its entirety.

What is claimed is:

1. An display apparatus comprising:
a first barrel;
a second barrel that is connected to the first barrel, achieves a stored state of a display device in a case where a relative distance is shortened by relatively moving with respect to the first barrel, and achieves a pulled-out state of the display device in a case where the relative distance is lengthened; and
a third barrel that is connected to the second barrel by snap fit connection and moves together with the second barrel with respect to the first barrel;
wherein the first barrel comprises a fastening part at a connection end of the first barrel at which the first barrel is connected to the second barrel so that the fastening part suppresses release of the snap fit connection in the pulled-out state of the display device and does not suppress the release of the snap fit connection in the stored state of the display device.

2. The display apparatus according to claim 1, wherein the fastening part comprises a rib formed so as to project from the connection end toward an optical axis of the display device.

3. The display apparatus according to claim 1, wherein a gap between a part of the snap fit connection and an internal surface of the first barrel in the pulled-out state of the display device is narrower than a gap between the part of the snap fit connection and the internal surface of the first barrel in the stored state of the display device.

4. The display apparatus according to claim 1, wherein an engagement width D1 is more than a gap D2 in the pulled-out state of the display device wherein the engagement width D1 represents a range in which the second barrel contacts the third barrel at a part of the snap fit connection and the gap D2 represents a space between the first barrel and the second barrel at the part of the snap fit connection.

5. The display apparatus according to claim 1, wherein the third barrel comprises an eyepiece cover that is formed from mold material so that the snap fit connection tends to be released in a case where an outer periphery of the third barrel is sagged.

6. The display apparatus according to claim 1, wherein the second barrel has a locking part, and
wherein the third barrel has a hook, and wherein the second barrel and the third barrel are connected by the snap fit connection by fitting the locking part to the hook.

7. The display apparatus of the claim 1, wherein the second barrel comprises a slide barrel that is provided with a visibility adjustment mechanism that adjusts visibility of the display device.

8. The display apparatus according to claim 7, wherein the visibility adjustment mechanism adjusts the visibility by changing a relative distance between the second barrel and a lens.

9. The display apparatus according to claim 1, wherein the first barrel comprises a fixed barrel equipped with a guide member and the second barrel moves relatively with respect to the first barrel along with the guide member.

10. The display apparatus according to claim 1, wherein an image display part is disposed at an end opposite to the connection end of the first barrel, and
wherein a part of the snap fit connection is disposed inside an outline of the image display unit when viewed in a direction of an optical axis of the display device.

11. The display apparatus according to claim 1, wherein the fastening part does not move in associated with the transfer between the state pulled-out state of the display device and the stored state of the display device.

12. The display apparatus according to claim 1, wherein the fastening part does not move in associated with movement of the second barrel which relatively moves with respect to the first barrel.

* * * * *